April 12, 1932.  J. C. REA  1,853,744
BREAKER CONTROL
Filed Nov. 22, 1929  7 Sheets-Sheet 1
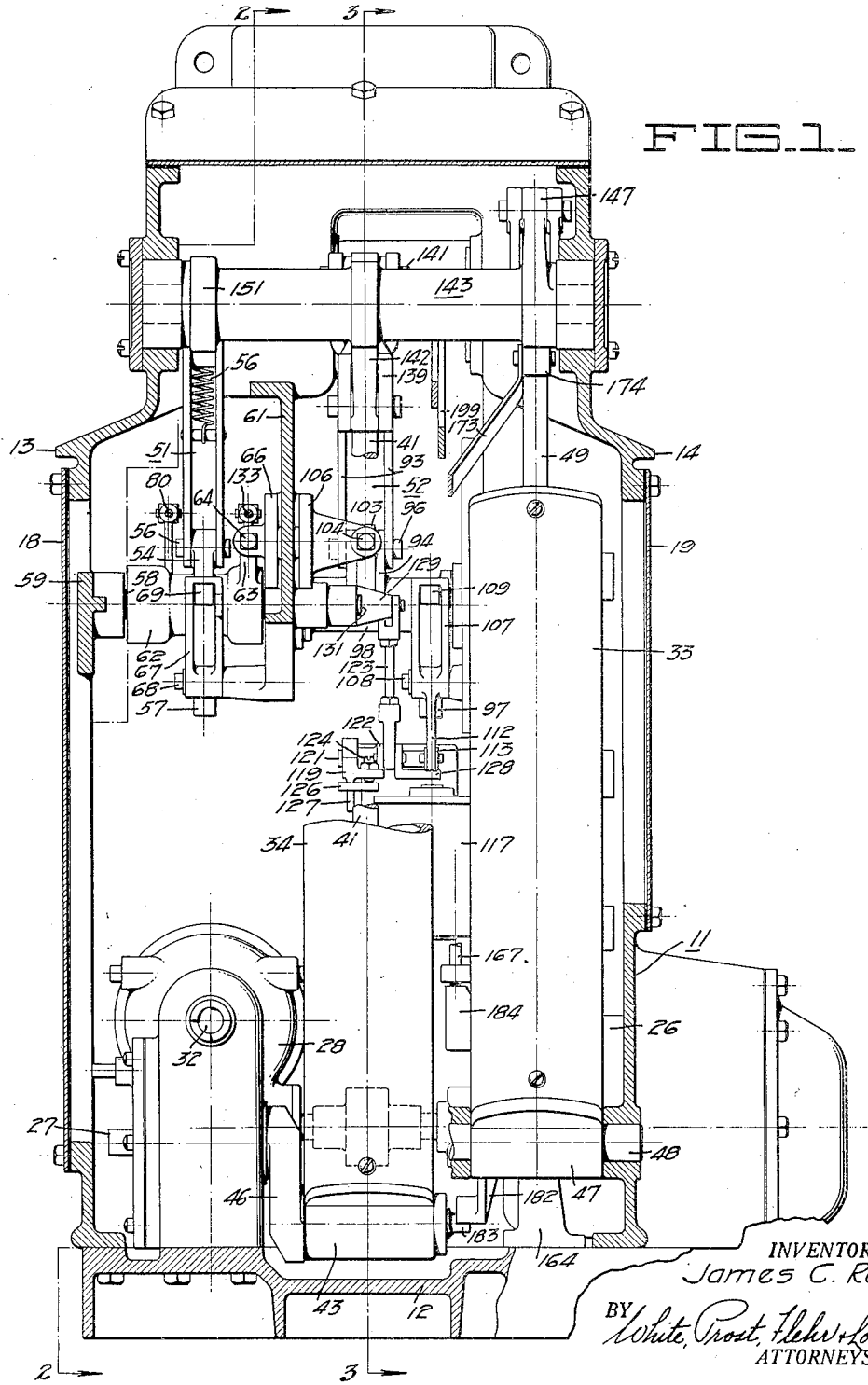
INVENTOR.
James C. Rea
BY White, Prost, Flehr & Lothrop
ATTORNEYS.

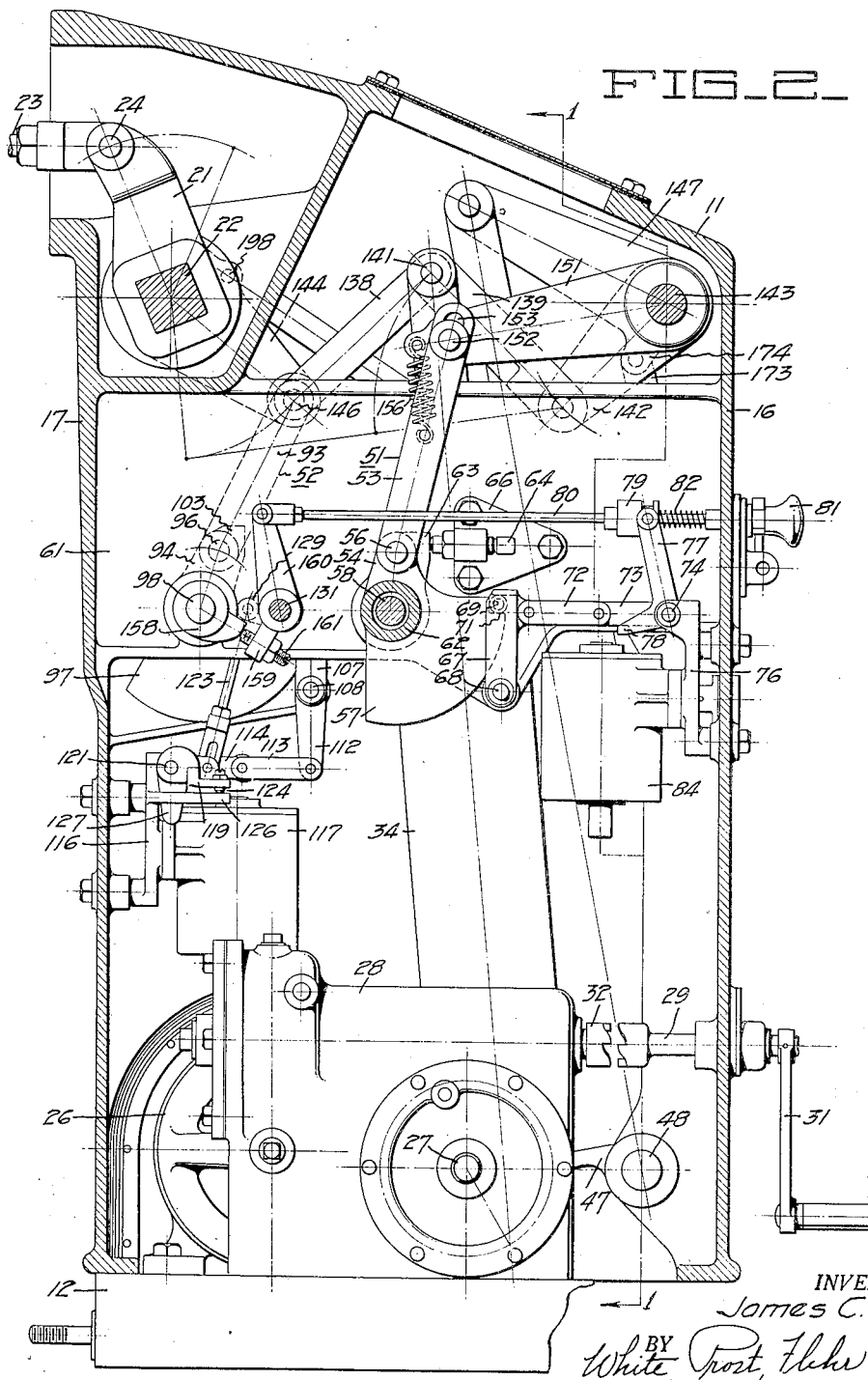

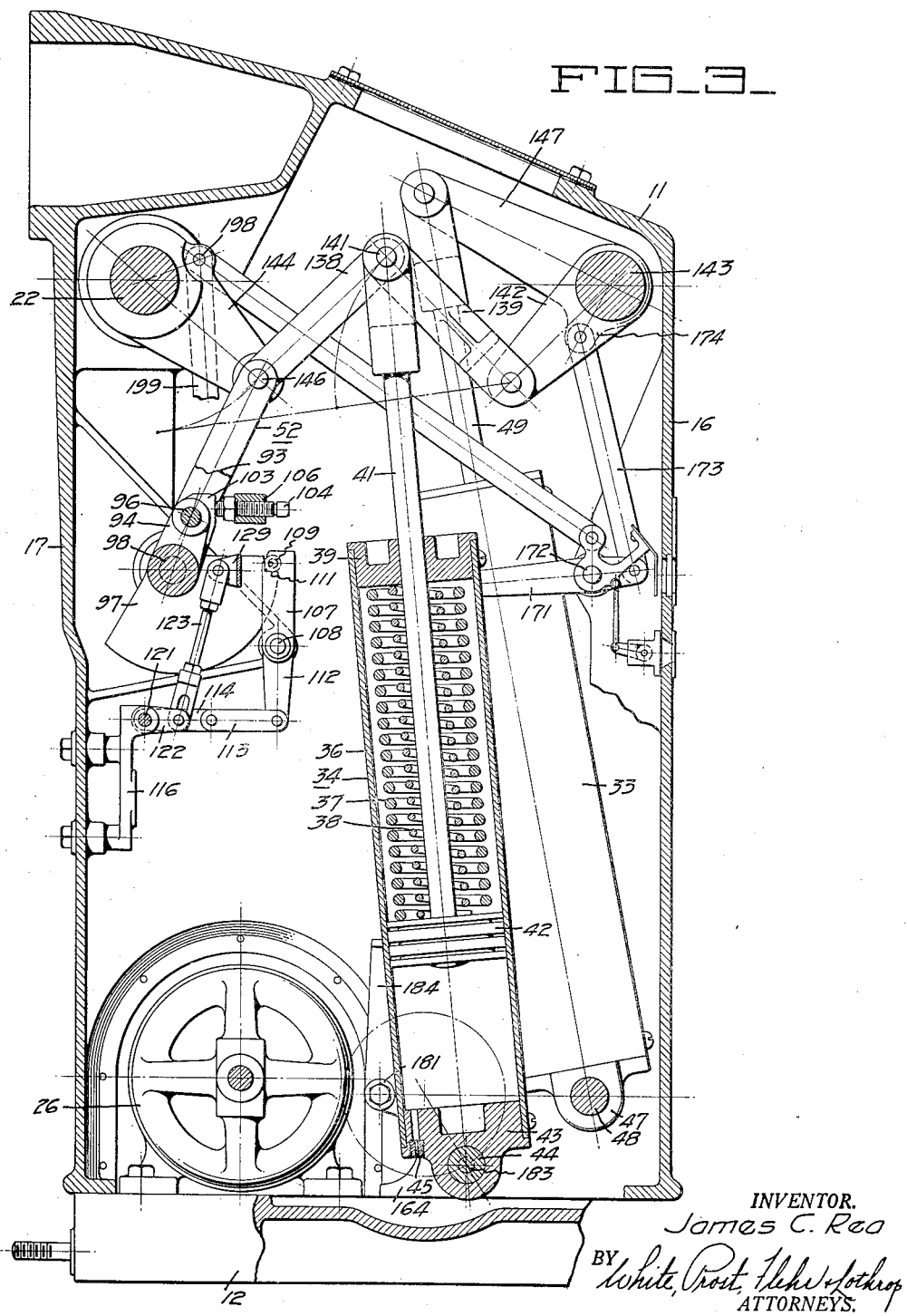
FIG_3_

April 12, 1932.　　　　　J. C. REA　　　　　1,853,744
BREAKER CONTROL
Filed Nov. 22, 1929　　　7 Sheets-Sheet 4
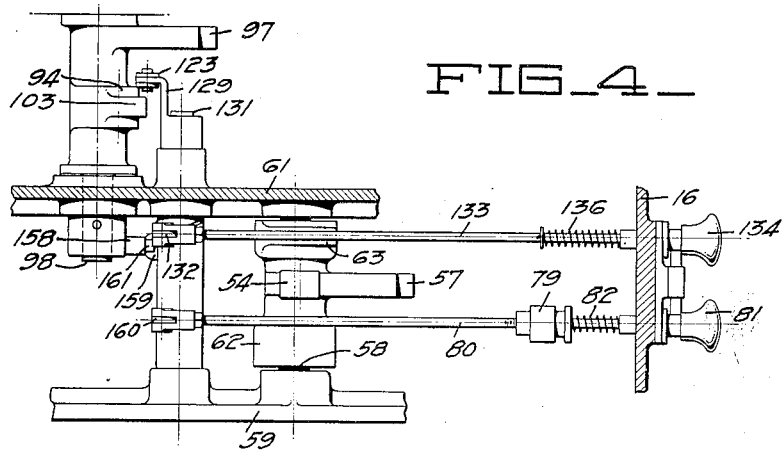
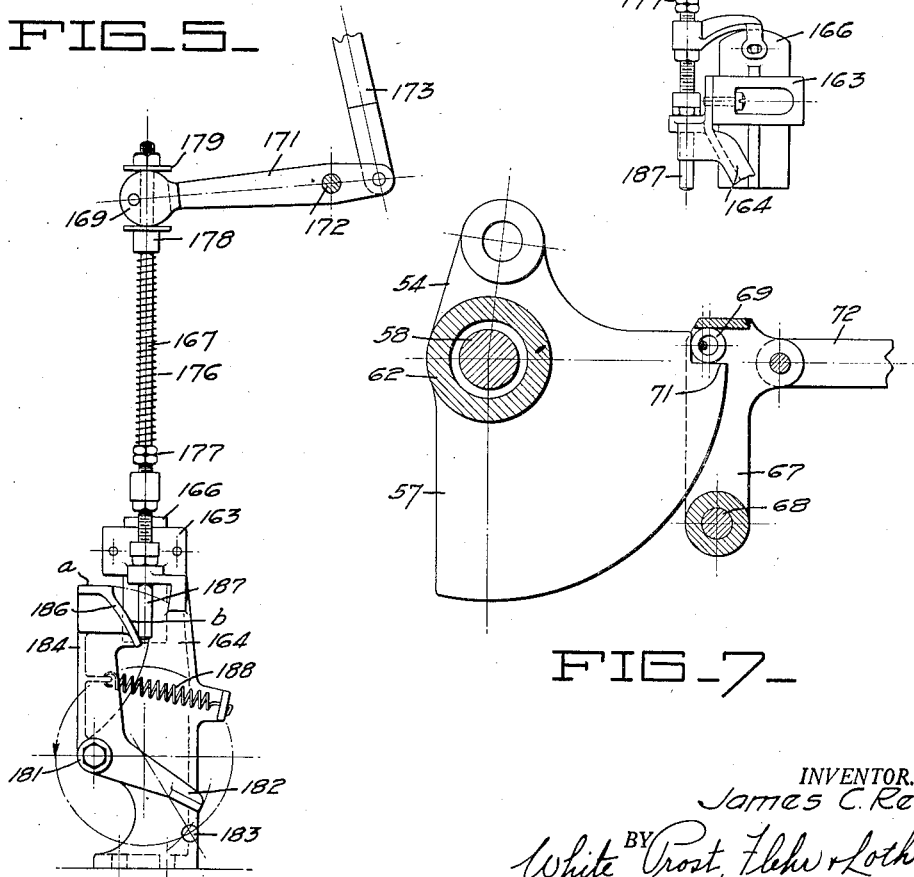
INVENTOR.
James C. Rea
BY White, Prost, Flehr & Lothrop
ATTORNEYS.

April 12, 1932.                J. C. REA                1,853,744
                            BREAKER CONTROL
                    Filed Nov. 22, 1929     7 Sheets-Sheet 5
FIG_8_        FIG_9_
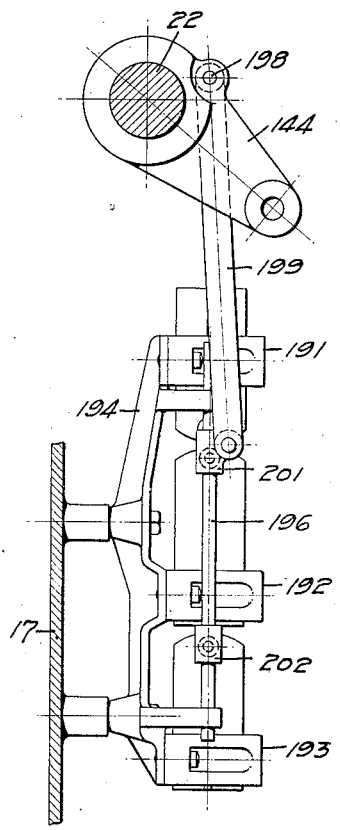
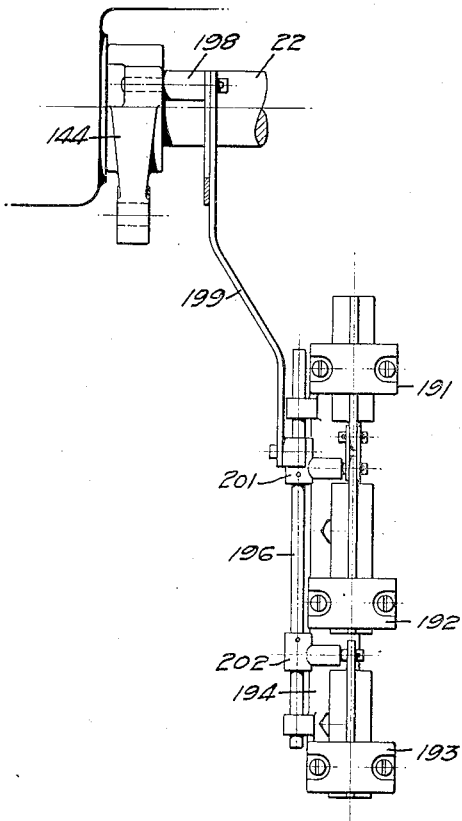
INVENTOR.
James C. Rea
BY
ATTORNEYS.

April 12, 1932.　　　　J. C. REA　　　　1,853,744
BREAKER CONTROL
Filed Nov. 22, 1929　　7 Sheets-Sheet 6
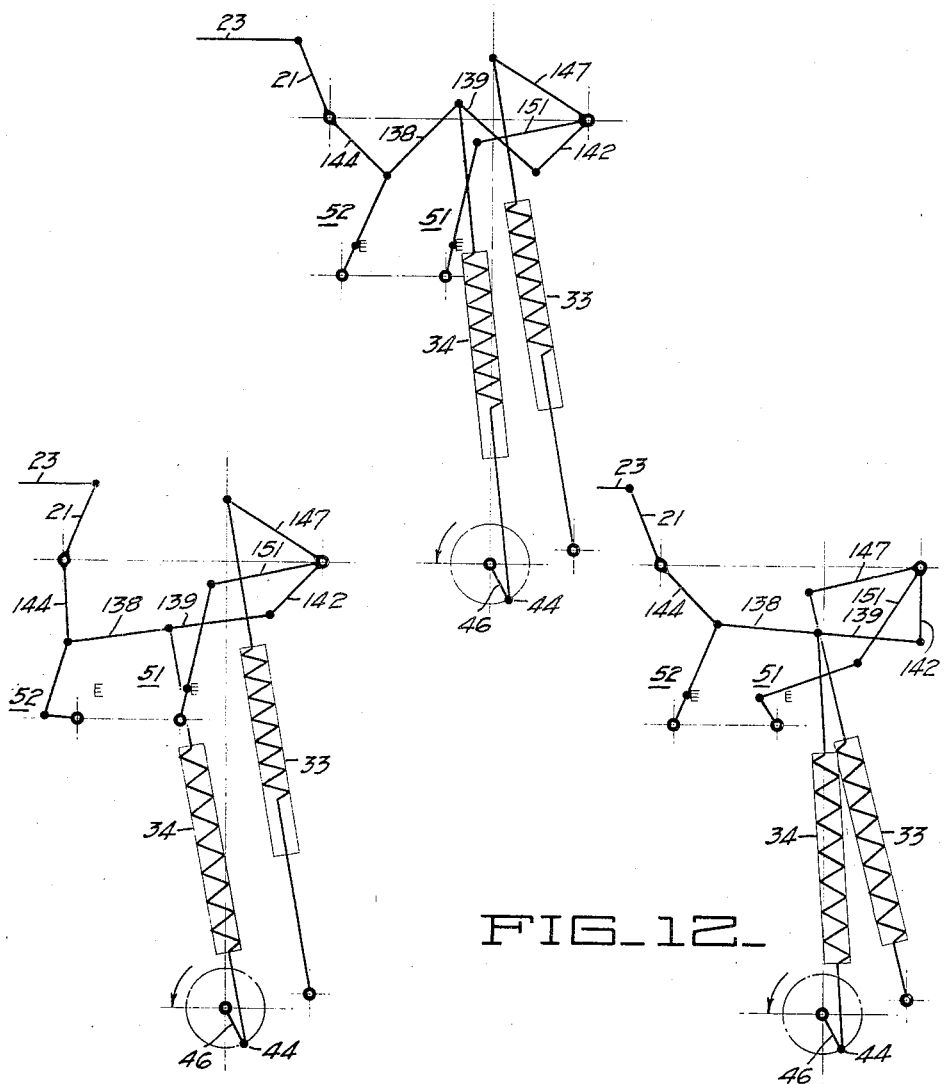
FIG_10_
FIG_11_
FIG_12_
INVENTOR.
James C. Rea
BY White, Prost, Flehr & Lothrop
ATTORNEYS.

April 12, 1932.  J. C. REA  1,853,744
BREAKER CONTROL
Filed Nov. 22, 1929  7 Sheets-Sheet 7
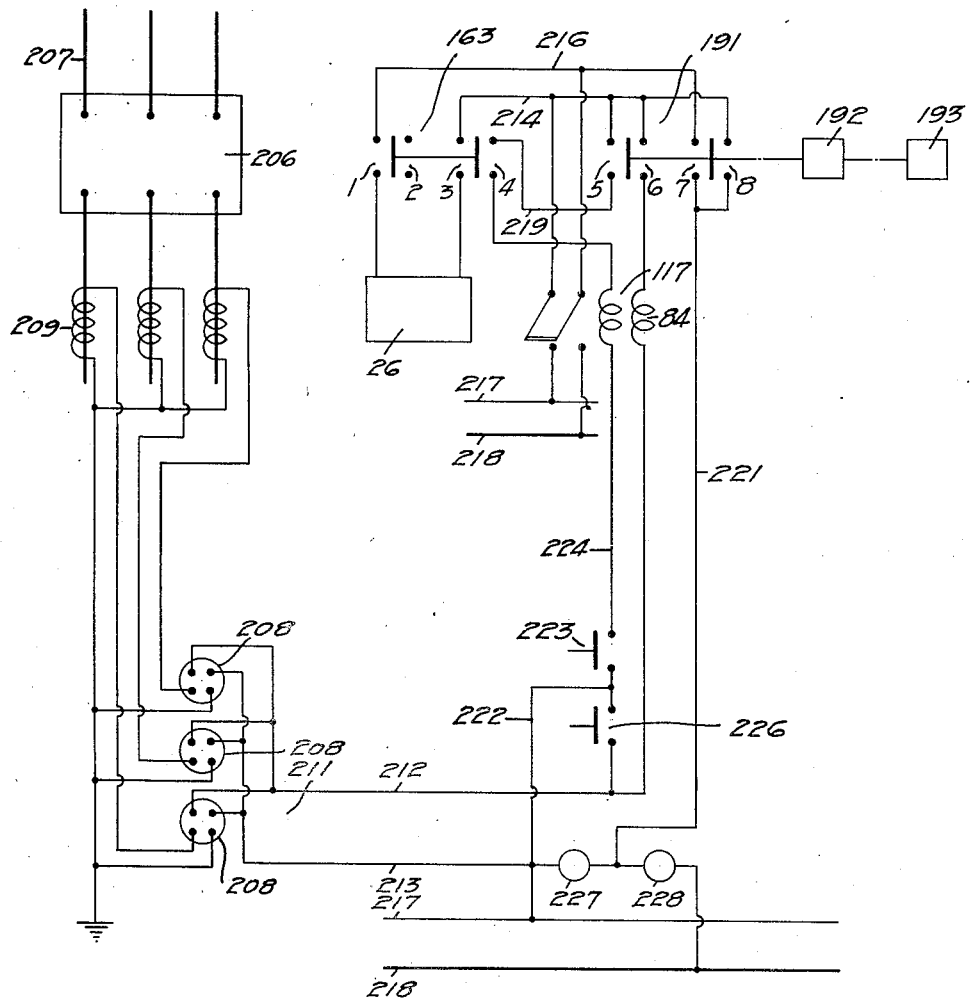
FIG_13_
INVENTOR
James C. Rea
BY
White, Prost, Hehr Lothrop
ATTORNEYS

Patented Apr. 12, 1932

1,853,744

UNITED STATES PATENT OFFICE

JAMES C. REA, OF SAN FRANCISCO, CALIFORNIA, ASSIGNOR TO PACIFIC ELECTRIC MANUFACTURING CORPORATION, OF SAN FRANCISCO, CALIFORNIA, A CORPORATION OF CALIFORNIA

BREAKER CONTROL

Application filed November 22, 1929. Serial No. 409,033.

This invention relates generally to apparatus for effecting operation of electrical devices, as for example for opening and closing breakers used in electrical power transmission systems.

It is an object of the present invention to devise apparatus of the above character which will require a relatively small amount of power for its operation, and which will therefore permit the use of a relatively small electric motor.

It is a further object of this invention to devise improved apparatus of the above type characterized by the use of a plurality of springs, which after certain successive operations have taken place, are restored to stressed condition successively by an electric motor or other motive means.

It is a further object of this invention to generally improve upon apparatus of the general class disclosed and claimed by Wilkins Patent 1,612,483.

Further objects of the invention will appear from the following description in which the preferred embodiment of the invention has been set forth in detail. It is to be understood that the appended claims are to be accorded a range of equivalents consistent with the state of the prior art.

Referring to the drawings:

Figure 1 is a front elevational view of apparatus incorporating the invention, taken along the line 1—1 of Fig. 2.

Fig. 2 is a side elevational view taken along the line 2—2 of Fig. 1.

Fig. 3 is a cross sectional view taken along the line 3—3 of Fig. 1.

Fig. 4 is a plan detail illustrating the manual control members and certain associated levers.

Fig. 5 is a detail illustrating the construction of mechanism for operating the current limiting switch.

Fig. 6 is a detail of the current limiting switch, and associated parts, as viewed from the right in Fig. 5.

Fig. 7 is a detail illustrating parts for releasably retaining one of the toggles in such position.

Fig. 8 is a detail illustrating representative pilot switches which may be incorporated with the invention.

Fig. 9 is a detail of the mechanism shown in Fig. 8, as viewed from the right of the latter figure.

Figs. 10, 11 and 12 are diagrammatic views illustrating the mode of operation of my apparatus.

Fig. 13 is a circuit diagram illustrating the manner in which the apparatus of this invention is incorporated with a circuit breaker.

In order to effect successive operations of circuit devices, such as circuit breakers, apparatus has previously been devised which stores the energy of motive means in suitable spring means. This spring means can then be released in stages, in order to effect successive closing and opening operations of the breaker. Apparatus of this character is disclosed and claimed by the above mentioned Wilkins Patent 1,612,483. In the present invention, spring means is likewise released for effecting successive switching operations, but in rewinding or restoring the spring means to stressed condition, the force is applied in stages, thus permitting the use of a smaller and less powerful electric motor. Other desirable and novel features are also incorporated in the present apparatus, as will be presently apparent.

In the particular embodiment of the invention disclosed in the drawings, the operating parts of the apparatus are shown enclosed within a convenient housing 11. This housing includes a suitable base portion 12, side walls 13 and 14, and front and rear walls 16 and 17. For convenience side walls 13 and 14 can be provided with removable cover plates 18 and 19. Mechanism is provided for applying motion to the breaker or circuit apparatus to which my device is connected, and this mechanism can include a rocker arm 21. Arm 21 is fixed upon a suitable shaft 22, which in turn is journaled to housing 11. The movable end of this arm 21 is connected to a rod 23, as by pivot pin 24. Rod 23 is ordinarily connected to one or more circuit breakers, so that upon rocking of arm 21, the breaker is opened or closed. For the particular arrangement of parts illustrated, the breaker is closed when rocker arm 21 is rocked in a clockwise direction, and is opened when rocked in the opposite direction.

The motive means for my apparatus is preferably an electrical motor 26, which can be conveniently mounted upon base portion 12, as shown in Fig. 3. This motor 26 is operatively connected to drive a rotatable shaft 27, thru a suitable speed reducing gearing 28. The details of this gearing will not be described in detail, as suitable mechanism for this purpose can be designed by one skilled in the art. It is preferable, however, that the shaft 27 be capable of being manually rotated, independently of motor 26. For this purpose there is shown (Fig. 2) a shaft 29, connected to a manual crank 31. Shaft 29 is adapted to be clutched with a shaft 32, associated with gearing 28. At some suitable point in the speed reducing gearing, an over-running clutch is provided, so that when the motor is not in operation, crank 46 can be operated by manually rotating shaft 32.

For effecting operating movement of arm 21, energy is stored in suitable means by rotation of shaft 27, and the stored energy can then be released successively to effect successive movement of arm 21. As energy storing means, I preferably utilize a pair of spring structures 33 and 34. Spring structure 33 is assigned the function of effecting rocking movement of arm 21 to open the breaker, while spring structure 34 effects closing. These spring structures can be somewhat similar in construction, the structure 34 being shown in detail in Fig. 3. In this figure there is illustrated a spring casing 36, housing the concentric spiral compression springs 37 and 38. A single compression spring will function satisfactorily, although for reliable operation, two or more springs are preferred. Closure 39 is secured to the upper end of casing 36, and slidably extended thru this closure, there is a rod 41. The lower end of rod 41 is connected to a piston 42, upon which the lower ends of springs 37 and 38 are seated. The upper ends of these springs are seated on the closure 39. Member 43 is connected to the lower end of casing 36, and in the case of spring structure 34, is pivotally connected to a pin 44. Pin 44 is carried by a crank 46 (Fig. 1), this crank being fixed to the driven shaft 27.

While the details of spring structure 33 can be substantially identical with structure 34, the member secured to the lower end of the spring casing in this instance has been designated at 47, and is pivotally connected to pin 48. Pin 48 is in turn fixed with respect to housing 11. In the case of structure 33, the slidable rod extending into the spring casing, has been designated at 49, and corresponds to rod 41 of structure 34. It is apparent that the compression of springs 37 and 38 tends to move rod 41 (in the case of structure 34) into casing 36, until piston 42 contacts with member 43. A small orifice 45 is provided in member 43 to permit limited escape of air from below piston 42. Therefore a dash-pot effect is produced, tending to cushion movement of rod 41 and to prevent shock when piston 42 contacts with member 43.

For connecting spring structures 33 and 34 with arm 21, I prefer to utilize an arrangement of tripable toggles and levers. The arrangement shown gives good results and includes a pair of toggle devices designated generally at 51 and 52. In place of utilizing conventional toggle devices each formed of a pair of links movable past dead center position, I preferably utilize special devices such as shown, in which device 51 includes a link or arm 53, pivotally connected to link 54, by means of pin 56. Link 54 is formed as a part of a segmental plate 57, and together with this plate is journaled to a shaft 58. For convenience shaft 58 can be supported by means of a bar 59 extending across the housing side wall 13, and a wall 61 extending across the interior of the housing. Link 54 and plate 57 are likewise secured to a hub 62, to which a finger 63 is secured. (Figs. 1 and 2.) Finger 63 is adapted to engage an adjustable set screw 64, carried by bracket 66. Set screw 64 is normally adjusted so that links 53 and 54 can be moved to a slightly passed dead center position.

To retain links 53 and 54 in set position, a link 67 is provided, which is pivotally carried by pin 68. The upper end of link 67 carries a roller 60 adapted to engage over the edge of a shoulder 71, formed on plate 57. When roller 69 is in engagement with shoulder 71, toggle 51 is retained in set position, and when link 67 is moved to bring roller 69 out of such engagement, toggle 51 is free to break or collapse.

Control of toggle 51, thru movement of link 67, can be either from a remote point, or by local manual means. Thus I have shown pivotally connected links 72 and 73, link 72 being pivotally connected to link 67, while link 73 is pivotally connected to the housing as by means of pin 74 carried by bracket 76. To effect manual operation, an L-lever 77 is provided, having its one arm formed with a finger 78, underlying link 73, and its other arm connected to a collar 79. Collar 79 is fixed to a slidable rod 80, which slidably projects thru wall 16 of housing 11, and is provided externally with a convenient knob 81. A suitable compression spring 82 serves to normally bias rod 80 in one direction. Normally when toggle device 51 is set, links 72 and 73 are in dead center position with respect to each other, and retain roller 69 in engagement with shoulder 71. When knob 81 is pulled outwardly against the tension of spring 82, link 73 is raised, thus moving link 67, and bringing roller 69 out of engagement with shoulder 71. To effect remote control, there is provided a solenoid 84, which can also be mounted upon bracket 76. When this solenoid is energized, a plunger is projected upwardly to raise links 72 and 73.

Toggle device 52 is preferably similar in construction to the device 51 described above. Thus links 93 and 94 correspond generally to the links 53 and 54 of device 51, and are pivotally connected by pin 96. Link 94 is fixed with respect to a segment plate 97, and both segment plate and link 94 are journaled about a convenient shaft 98. Lever 94 carries a portion 103, corresponding to lever 63 of toggle device 51, which is adapted to engage an adjustable set screw 104. This set screw is carried by a bracket 106, secured to wall 61. A lever 107 corresponding to lever 67 of device 51, is pivotally mounted upon shaft 108, and carries a roller 109 which can engage shoulder 111 formed on plate 97.

In order to control operation of toggle device 52, I also prefer in this instance to provide means whereby this device can be released both manually and from a remote point. Thus extending downwardly from lever 107, I provide an arm 112, which in turn is connected to corresponding ends of links 113. Links 113 are pivotally connected with links 114, which in turn are pivotally connected to a bracket 116. A solenoid 117 is arranged so that when energized, its plunger engages link 114 and raises both links 114 and 113, thus swinging lever 107 out of engagement with segment plates 97. To effect manual operation, I provide an arm 119 pivotally connected to bracket 116, by means of shaft 121. A lever 122 is adapted to rotate together with lever 119, and has a pin and slot connection with the lower end of a rod 123. An adjustable set screw 124 is provided in lever 119, and is adapted to engage the upper face of a stationary shelf 126. A counterweight 127 can depend from lever 119, in order to insure biasing of set screw 124 towards shelf 126. As shown in Fig. 1, connected to lever 122, there is a laterally extending lug 128, adapted to underlie link 114. Therefore by adjusting set screw 124, link 114 can be raised or lowered, so that when links 113 and 114 drop down to the position they assume when lever 107 is in engagement with segment plate 97, they will move to approximately dead center position. The upper end of rod 123 is connected to a lever 129, which in turn is fixed to shaft 131. Lever 129 is adapted to rotate together with another lever 132, and this latter lever is pivotally connected to the inner end of a manual pull rod 133. As shown in Fig. 4 this rod 133 extends thru the wall 16 of the housing, adjacent to the rod 80, and is provided with a manual knob 134. Suitable means such as a compression spring 136, serves to normally urge rod 133 inwardly. By pulling rod 133 outwardly, it is apparent that rod 123 will be raised, thus causing rocking of lever 119, and causing lug 128 to lift links 113 and 114, thus causing release of segment plate 97.

For associating the spring structures 33 and 34, with toggle devices 51 and 52, and rocker arm 21, I have shown means including links 138 and 139, which are pivotally connected to the upper end of rod 41, by means of pin 141. Link 139 is in turn pivotally connected to arm 142, which is carried by shaft 143. Links 138 are pivotally connected to a lever 144, by means of pivot pin 146, and lever 144 is fixed to shaft 22. Links 93 are also pivotally connected with lever 144, by means of pin 146. The upper end of rod 49 of spring structure 33, is pivotally connected to an arm 147, which is also carried by shaft 143, and which rotates together with arm 142.

The mode of operation of my apparatus will be presently explained in greater detail, by reference to Figs. 10, 11 and 12. However at this point it may be stated that in Fig. 3 both spring structures 33 and 34 are shown stressed or wound. Spring structure 34 is retained in stressed condition by toggle device 52 acting on pin 146. In order to cause toggle device 51 to retain spring structure 33 in stressed condition, another arm 151 is carried by shaft 143, and this arm can also rotate together with arms 147 and 142. A pin 152 carried by arm 151, extends thru a slot 153 in the upper end of link 53. (Fig. 2.) Spring 156 is normally under stress to bias link 53 upwardly relative to arm 151.

As the apparatus is illustrated in Figs. 1, 2 and 3, rocker arm 21 is in a position corresponding to open position of the breaker. Assuming now that toggle device 52 is tripped or broken, as by energizing solenoid 117, spring structure 34 acting upon arm 144 thru links 138 and 139, rotates shaft 22 to move rocker arm 21 a certain angular distance, sufficient to close the breaker. Subsequently if toggle device 51 is tripped, as by energizing solenoid 84, spring structure 33 acting upon arm 147, rotates this arm in a counterclockwise direction, thus moving arm 21 back to the position shown in Figs. 1 to 3 inclusive. In other words spring structure 34, when released by tripping toggle device 52, acts to close the breaker, and spring structure 33 when released by tripping toggle device 51, causes subsequent opening of the breaker.

In order to keep the above operations in proper sequence, I preferably provide means for preventing manual tripping of toggle device 51, before the toggle device 52 is tripped. Suitable means of this character is illustrated in Fig. 2, and consists of a cam 158, carried by shaft 98, and arranged to rotate together with segment plate 97 and link 94. A finger 159 is carried by lever 160 and is rotatable about shaft 131, but independently of shaft 131. A set screw 161 carried by finger 159 is adapted to engage the face of cam 158. When toggle device 52 is in set position, cam 158, by engaging the end of set screw 161, locks lever 160 and rod 80 connected to the same, in the position shown in Fig. 2, thus preventing an operator from pulling knob 81 outwardly to trip toggle device 52 except at the proper time.

When my apparatus is installed, a suitable energizing circuit is provided for motor 26. Closing of this circuit is controlled by suitable means such as a pilot switch operated by movement of the circuit breaker. For example in general practice, the pilot switch is closed upon opening of the breaker, thus closing the motor circuit and causing the motor to slowly rotate crank 46. Assuming that the motor is energized after both spring structures 33 and 34 have been released, and that thereafter crank 46 rotates slowly in a counterclockwise direction as viewed in Fig. 3, the first half revolution of crank pin 44, toggle device 51 is reset and spring structure 33 is restored to stressed condition. For the last half revolution of pin 44, spring structure 34 is restored to stressed condition.

I preferably provide means for disconnecting or disrupting the motor circuit, when the pin 44 returns to its initial position. In Fig. 5 I have shown a conventional switch 163 for this purpose. For the sake of clarity, the showing of this switch has been omitted from Figs. 1–3 inclusive. This switch is mounted upon a suitable bracket 164, and has the usual movable member 166, for opening and closing the contacts thereof. For operating switch 163, I provide an upstanding slidable rod 167, guided by members secured to bracket 164. The upper end of rod 167 extends loosely thru a bifurcated end portion 169, of a lever 171. Lever 171 is journaled as by means of shaft 172, and its other end is pivotally connected to a link 173. The upper end of link 173 is pivotally connected to an arm 174, carried by arm 147, and rotatable together with arms 142, 147 and 151. Helical spring 176 surrounds rod 167, and has its lower end seated upon lock nuts 177. The upper end of this spring presses against a collar 178, which is slidably disposed upon rod 167. Washer 179 is secured to the upper end of rod 167, and serves to engage the upper face of bifurcated portion 169.

Pivotally secured to bracket 164, there is a tripping lever 181, having one portion 182 thereof extending into the path of travel of a pin 183. Pin 183 is secured to and extends from the pin 44 of crank 46, and therefore moves in a circular path. The other arm 184 of lever 181, is provided with a curved cam face 186. The lower end of rod 167 forms a pin 187 adapted to cooperated with cam face 186. Cam face 186 is preferably provided with a relatively flat portion $a$, and an adjacent angular portion $b$. By suitable means such as a tension spring 188, crank 181 is normally biased to urge cam portion $a$ directly beneath pin 187. As has been previously explained, during a rewinding operation, as pin 44 moves in a circular path from an initial position and as this pin and also pin 183 returns to initial position, it is desired to operate switch 163 to interrupt the motor circuit. When pin 183 has approximately returned to its initial position, it engages arm 182, thus moving lever 181 in a counterclockwise direction, to bring cam portion $a$ out of contact with the lower end of pin 187. At this time the bifurcated portion 169 of lever 171 is in a lowered position, and spring 176 is compressed. The pressure of pin 187 against the inclined cam portion $b$ causes continued movement of lever 181, to the position shown in Fig. 5. Movement of rod 167 downwardly, operates switch 163 to disrupt the motor circuit. When the breaker is closed, by tripping toggle device 52, rod 167 still retains its same position, due to the fact that arms 142, 147 and 151 do not move. However upon subsequently opening the breaker responsive to tripping of toggle device 51, link 173 is moved downwardly, thus raising bifurcated portion 169, and raising rod 167 until pin 187 permits tripping lever 181 to return to its initial position, with cam portion $a$ directly below pin 187. The motor circuit is then energized and pin 183 completes another revolution, and again trips lever 181 during the completion of its circular movement.

Pilot switches for closing the signal circuit, and for other functions, can also be mounted within the housing 11, in place of being associated with the circuit breaker. Thus as shown in Figs. 8 and 9, I can provide switch structures 191, 192 and 193, carried by a suitable bracket 194. A rod 196, is slidably retained by bracket 194, and is connected to pin 198 on arm 144, by means of link 199. An adjustable collar 201 on rod 196, serves to connect this rod with the movable members of both switches 191 and 192, and a similar adjustable collar 202 serves to connect rod 196 with the movable member of switch 193. It is apparent that with rocking movement of arm 21 corresponding to opening and closing movements of the breaker, switches 191, 192 and 193, will be operated simultaneously. In order to avoid complicating Figs. 1, 2 and 3, these pilot switches and their associated parts have been omitted.

A better conception of the operation of my apparatus can be secured by reference to Figs. 10, 11 and 12. These figures illustrate certain principal parts diagrammatically. Fig. 10 illustrates the position of arm 21 corresponding to open position of the breaker, and with spring structures 33 and 34 in wound condition. Both toggle devices 51 and 52 are set, ready to be tripped or broken. To close the breaker, toggle 52 is tripped, thus permitting spring structure 34 to pull links 138 and 139 downwardly to rock arm 21 and close the breaker. The relationship of the parts for closed position of the breaker, is shown in Fig. 11. It will be noted that arms 142, 147 and 151, remain in the same position which they occupied in Fig. 10. In order to subsequently open the breaker, as for example in response to an overload, or by manually applied force such as by pulling outwardly upon knob 81, toggle device 51 is tripped to permit arms 142, 147 and 151 to rotate in a counter-clockwise direction, thus applying motion thru the straightened links 138 and 139, to arms 21 and 144. The position of the various parts after toggle device 51 has been tripped and the breaker opened, is shown in Fig. 12. It will be noted that in changing from the position shown in Fig. 11 to that of Fig. 12, the point of application of spring structure 34 to links 138 and 139 swings from left to right, this being made possible due to the fact that the lower end of spring structure 34 is pivotally connected to pin 44. Immediately after toggle 51 is collapsed and the breaker has been opened, the motor circuit is automatically closed, and crank 46 commences to rotate in a counterclockwise direction as viewed in Figs. 10 to 12 inclusive, to rewind spring structures 33 and 34. As has been previously explained, during approximately the first half revolution of crank 46, or until this crank has reached the upper limit of its movement, toggle device 51 is reset, and at the same time rotation of arms 142, 147 and 151 in a clockwise direction back to the position shown in Figs. 10 and 11 restores spring structure 33 to stressed condition. During the last half revolution of crank 46 or while this crank is moving downwardly to its initial position, spring structure 33 is retained stresses due to the setting of toggle device 51, and since links 138 and 139 retain their angular relationship as shown in Fig. 10, spring structure 34 is restored to stressed condition. Since winding of the spring structures 33 and 34 is done during different parts of the movement of crank 46, it is apparent that the torque applied to the crank need only be sufficient to separately compress the springs of structures 33 and 34, thus enabling a relatively small electric motor to be employed. Furthermore in the rewinding operation, the power supplied from the motor is utilized efficiently, since crank 46 is applying force to one or the other of the spring structures 33 and 34 during substantially the entire rotation of the same.

The circuit diagram of Fig. 13, illustrates the manner in which the apparatus described above can be incorporated with a circuit breaker. Thus a circuit breaker has been represented at 206, associated with the power transmission lines 207. Overload relays 208, are associated with power transmission lines 207 by means of the usual current transformers 209. The contacts of overload relays 208 are arranged to control a common circuit 211, which includes conductors 212 and 213. Switch 163 of my apparatus includes the contact sets 1, 2, 3 and 4, and switch 191 likewise includes the contact sets 5, 6, 7 and 8. Switches 192 and 193 can be connected to other circuits not shown. Motor 26 is connected to one side of contacts 1 and 3, the other sides of these contacts being connected to conductors 214 and 216. These conductors 214 and 216 are connected to bus conductors 217 and 218, forming a convenient source of direct current. Conductor 214 is also connected to one side of contacts 5, 6 and 8, and conductor 216 to one side of contact 7. The other side of contact 5 is connected to one side of contact 4 by means of conductor 219, while the other sides of contacts 7 and 8 are connected to conductor 221. Closing solenoid 117 has its one terminal connected to contact 4, and its other terminal connected to a conductor 224 thru a series switch 223. Conductor 222 connects to conductor 213, and also to bus conductor 217. Opening solenoid 84 has its one terminal connected to contacts 6, and its other terminal connected to conductor 212 and thus to conductor 222 thru switch 226. Conductor 221 connects between signal lamps 227 and 228, these lamps being in turn connected in series across bus conductors 217 and 218.

Referring again to the diagram of Fig. 13, assuming that the breaker is closed, contacts 2 and 4 of switch 163 are closed and likewise contacts 6 and 8 of switch 191 are closed. If the operator desires to open the breaker, switch 226 is closed, either by manual operation, or by a remote control, to energize opening solenoid 84. Upon opening of the breaker, contacts 1 and 3 are closed to close the motor circuit 26, and the motor circuit is kept closed for a sufficiently long period to rewind the breaker control, after which contacts 1 and 3 are automatically opened and contacts 2 and 4 again closed. To effect closing of the breaker, switch 223 is closed to energize closing solenoid 117. Energizing of opening solenoid 84 also occurs automatically in the event of an overload or abnormal condition on the transmission lines 207, by virtue of closing of relay circuits 211. Signal lamps 227 and 228, are preferably of different colors, to indicate closed and open positions of the breaker. The open condition of contacts 4 while the motor circuit is closed prevents the energizing of closing solenoid 117 during a rewinding operation.

I claim:
1. In an operator of the character described, mechanism adapted to be successively actuated to effect a plurality of switching operations of an associated circuit apparatus, energy storing means adapted to be released for successively actuating said mechanism, and means for storing sufficient energy to effect said switching operations in said storing means in distinct stages.

2. In an operator of the character described, mechanism adapted to be successively actuated to effect a plurality of switching operations of an associated circuit apparatus, energy storing means adapted to be released for successively actuating said mechanism, a motor, and means for causing said motor to store sufficient energy to effect said switching operations in said storing means in successive stages.

3. In an operator of the character described, mechanism adapted to be successively actuated to effect a plurality of switching operations of an associated circuit apparatus, spring means adapted to be released after being stressed for successively actuating said mechanism, and means for restoring said spring means to stressed condition in stages to store sufficient energy to effect more than one of said switching operations.

4. In an operator of the character described, mechanism adapted to be successively actuated to effect a plurality of switching operations of an associated circuit apparatus, spring means adapted to be released after being stressed for successively actuating said mechanism, and means for stressing said spring means in stages to store sufficient energy to effect more than one of said switching operations, said means including a member movable thru a cyclic path to effect said stressing.

5. In an operator of the class described, mechanism adapted to be successively actuated to effect successive switching operations of an associated circuit apparatus, spring means adapted to be successively released for effecting a plurality of successive actuations of said mechanism before restoring the spring means to stressed condition, and means for effecting stressing of said spring means in stages while said mechanism is inactive.

6. In an operator of the class described, mechanism adapted to be successively actuated to effect successive switching operations of an associated circuit apparatus, spring means adapted to be successively released for effecting a plurality of successive actuations of said mechanism before restoring the spring means to stressed condition, a member rotatable from an initial position after complete release of said spring means, and means serving to associate the spring means with said member for stressing the spring means in stages during successive angular movements of said member.

7. In an operator of the class described, mechanism adapted to be successively actuated to effect successive switching operations of an associated circuit apparatus, a plurality of springs adapted to be successively released for effecting a plurality of successive actuations of said mechanism before either spring is restored to stressed conditions, and means for successively stressing said springs before either spring is released.

8. In an operator of the class described, mechanism adapted to be successively actuated to effect successive switching operations of an associated circuit apparatus, a plurality of springs adapted to be successively released for effecting a plurality of successive actuations of said mechanism before either spring is restored to stressed condition, and means including a rotatable member for successively stressing said springs before either spring is released.

9. In an operator of the class described, mechanism adapted to be successively actuated to effect successive switching operations of an associated circuit apparatus, a plurality of springs adapted to be successively released for effecting a plurality of successive actuations of said mechanism before either spring is restored to stressed condition, a motor, and means connecting said motor and said springs for successively stressing said springs before either spring is released.

10. In an operator of the class described, mechanism adapted to be successively actuated to effect switching operations of an associated circuit apparatus, a pair of springs, means including a pair of toggles for retaining said springs in stressed condition, means connecting said springs and said mechanism whereby upon successively breaking said troggles, the mechanism is successively actuated, and means for successively stressing said springs before either spring is released.

11. In an operator of the class described, mechanism adapted to be successively actuated to effect switching operations of an associated circuit apparatus, a pair of springs, means including a pair of toggles for retaining said springs in stressed condition, means connecting said springs and said mechanism whereby upon successively breaking said toggles the mechanism is successively actuated, a motor, a rotatable member driven by said motor, and means for effecting successive stressing of said springs upon rotation of said member before either spring is released.

12. In an operator of the class described, mechanism adapted to be successively actuated to effect switching operations of an associated circuit apparatus, a pair of springs, means including a pair of toggles for retaining said springs in stressed condition, means connecting said springs and said mechanism whereby upon successively breaking said toggles the mechanism is successively actuated, a motor, a member driven by the motor thru an angle of substantially 360° for a rewinding operation, and means associating said springs and the motor for effecting stressing of one spring during the initial angular movement of said member and for stressing the other spring during final angular movement of said member.

13. In a breaker operator of the class described, a pair of springs, an arrangement of levers to which both springs are connected, a pair of toggles associated with said levers, a rotatable member to which one spring is also connected, a relatively fixed member to which the other spring is also connected, said toggles being arranged to retain a respective spring stressed when set, a member movable in one direction upon breaking one toggle and movable in the opposite direction upon subsequent breaking of the other toggle, and means for rotating said rotatable member to effect stressing of said springs, rotation of said member thru substantially 180° serving to reset a toggle and to stress one spring, and continued rotation of said member serving to stress the other spring.

14. In an operator of the class described, mechanism adapted to be successively actuated to effect successive switching operations of an associated apparatus, a pair of spring structures adapted to be successively and independently released for effecting a plurality of successive actuations of said mechanism before either spring is restored to stressed condition, and means for stressing said springs before either spring is released.

15. In an operator of the class described, a tripable device including a movable member having a shoulder, a lever, a roller loosely carried by said lever and adapted to engage over said shoulder, said roller when in engaged position being interposed between the opposed surfaces of a portion of said lever and of said shoulder, and a linkage mechanism connected to said lever and adapted to move the same to bring said roller out of engagement with said shoulder.

16. In an operator of the character described, mechanism adapted to be successively actuated to effect opening and closing of an associated circuit breaker, energy storing means adapted to be released for successively actuating said mechanism, means adapted to be actuated for effecting release of said energy storing means to effect opening of the breaker, means adapted to be actuated for effecting release of said energy storing means to effect closing of the breaker, and interlocking means serving to preclude operation of said opening releasing means when said breaker is open.

In testimony whereof, I have hereunto set my hand.

JAMES C. REA.